United States Patent
Wang (10) Patent No.: US 10,389,549 B2
(45) Date of Patent: Aug. 20, 2019

(54) METHOD AND APPARATUS FOR MESSAGE TRANSMISSION

(71) Applicants: CHERY AUTOMOBILE CO., LTD., Wuhu (CN); WUHU POWER-TECHNOLOGY RESEARCH CO., LTD., Wuhu (CN)

(72) Inventor: Zhonglin Wang, Wuhu (CN)

(73) Assignees: CHERY AUTOMOBILE CO., LTD., Anhui (CN); WUHU POWER-TECHNOLOGY RESEARCH CO., LTD., Anhui (CN)

(*) Notice: Subject to any disclaimer, the term of this patent is extended or adjusted under 35 U.S.C. 154(b) by 144 days.

(21) Appl. No.: 15/521,709

(22) PCT Filed: Sep. 29, 2015

(86) PCT No.: PCT/CN2015/091107
§ 371 (c)(1),
(2) Date: Apr. 25, 2017

(87) PCT Pub. No.: WO2016/066001
PCT Pub. Date: May 6, 2016

(65) Prior Publication Data
US 2017/0250836 A1 Aug. 31, 2017

(30) Foreign Application Priority Data
Oct. 28, 2014 (CN) .......................... 2014 1 0586534

(51) Int. Cl.
*H04L 12/40* (2006.01)
*H04L 29/06* (2006.01)
*H04L 12/66* (2006.01)

(52) U.S. Cl.
CPC ........ *H04L 12/40* (2013.01); *H04L 12/40052* (2013.01); *H04L 12/66* (2013.01);
(Continued)

(58) Field of Classification Search
None
See application file for complete search history.

(56) References Cited

U.S. PATENT DOCUMENTS

| 9,649,999 B1* | 5/2017 | Amireddy ............. B60R 16/023 |
| 2007/0165625 A1* | 7/2007 | Eisner ..................... G06F 9/546 |
| | | 370/389 |

(Continued)

FOREIGN PATENT DOCUMENTS

| CN | 101159678 A | 4/2008 |
| CN | 101599923 A | 12/2009 |

(Continued)

OTHER PUBLICATIONS

Chinese Office Action dated Apr. 6, 2017.
International Search Report of the PCT/CN2015/091109 dated Jan. 7, 2016.

*Primary Examiner* — Otis L Thompson, Jr.
(74) *Attorney, Agent, or Firm* — Dilworth & Barrese, LLP.; Michael J. Musella, Esq.

(57) ABSTRACT

The present invention provides a method and an apparatus of message transmission in vehicle communication field. The method includes: determining current state of a gateway; generating instruction message indicating the current state in accordance with the current state of the gateway; and transmitting the instruction message to a receiving unit. The present invention solves the problem of a lower message transmission stability, improves the message transmission stability. The present invention is for message transmission in a network.

8 Claims, 6 Drawing Sheets

(52) U.S. Cl.
CPC .... *H04L 29/06* (2013.01); *H04L 2012/40215* (2013.01); *H04L 2012/40273* (2013.01)

(56) References Cited

U.S. PATENT DOCUMENTS

| | | | | |
|---|---|---|---|---|
| 2008/0276107 | A1* | 11/2008 | Bogavac | H04L 12/12 713/323 |
| 2010/0080144 | A1* | 4/2010 | Greenberg | H04L 12/1863 370/253 |
| 2010/0131642 | A1* | 5/2010 | Chalikouras | G06Q 30/02 709/224 |
| 2010/0131816 | A1* | 5/2010 | Yamamoto | H04L 12/4013 714/749 |
| 2011/0128855 | A1* | 6/2011 | Ando | H04J 3/0652 370/236 |
| 2012/0230201 | A1* | 9/2012 | Thota | H04L 47/125 370/241 |
| 2013/0121158 | A1* | 5/2013 | Balasubramanian | H04L 12/437 370/241 |
| 2013/0159466 | A1* | 6/2013 | Mao | H04L 67/12 709/218 |
| 2013/0166081 | A1* | 6/2013 | Sanders | G05B 11/01 700/286 |
| 2013/0179569 | A1* | 7/2013 | Alred | H04L 12/2834 709/224 |
| 2013/0208622 | A1* | 8/2013 | Ibuki | H04W 84/18 370/254 |
| 2013/0211628 | A1* | 8/2013 | Thurow | G06F 17/00 701/2 |
| 2013/0219170 | A1* | 8/2013 | Naitou | H04L 63/0428 713/153 |
| 2014/0081518 | A1* | 3/2014 | Son | H04L 12/413 701/36 |
| 2015/0298550 | A1* | 10/2015 | Okada | B60K 37/06 345/173 |
| 2016/0174148 | A1* | 6/2016 | Seed | H04W 52/0216 370/311 |
| 2016/0246296 | A1* | 8/2016 | Gelinske | H04W 4/70 |
| 2016/0308887 | A1* | 10/2016 | Jung | H04L 12/40006 |
| 2017/0111182 | A1* | 4/2017 | Ansari | H04N 21/482 |
| 2017/0372535 | A1* | 12/2017 | Miller | G07C 5/02 |
| 2018/0048619 | A1* | 2/2018 | Maluf | H04L 61/106 |

FOREIGN PATENT DOCUMENTS

| | | |
|---|---|---|
| CN | 101841452 A | 9/2010 |
| CN | 102231705 A | 11/2011 |
| CN | 103248564 A | 8/2013 |
| CN | 104378272 A | 2/2015 |
| EP | 1189393 B1 | 4/2005 |

\* cited by examiner

METHOD AND APPARATUS FOR MESSAGE TRANSMISSION

This application claims priority of Chinese Patent Application No. 201410586534.7, filed before Chinese Patent Office on Oct. 28, 2014 and entitled "Method and Apparatus for Message Transmission", which is incorporated herein by reference in its entirety.

TECHNICAL FIELD

The present invention relates to a vehicle communication technology, particularly to a method and system for transmitting information.

BACKGROUND

With the rapid development of the automobile industry, Controller Area Network (CAN) has been widely used in automobiles. The electronic control units of the vehicle are able to transmit messages through the CAN network, to control the vehicle. With the increase of the electronic control units of the vehicle, the communication between the electronic control units is also increased, resulting in an unstable CAN network. In order to improve the stability of the CAN network, a gateway is utilized to control the message transmission of the entire CAN network.

In the prior art, when the electronic control unit A sends a message to the electronic control unit B, the electronic control unit A is recognized as a transmission unit, the electronic control unit B is considered as a receiving unit. The transmission unit generates a message and sends the message to a gateway. The gateway then forwards the received message to the receiving unit, to complete the message transmission on the CAN network. In real applications, since the CAN network is unstable, there may be circumstances that the gateway does not receive the message sent by the transmission unit. Thus, the gateway does not forward the message to the receiving unit. If the message is lost when the transmission unit sends the message to the gateway, the gateway stops sending message or sending a garbled text to the receiving unit.

In the prior art, the gateway stops sending messages or sending a garbled text to the receiving unit when the message is not received or lost. Since the receiving unit is not able to determine the transmission status of the message in CAN network, the receiving unit cannot respond accordingly, resulting in low reliability of the message transmission.

SUMMARY

To solve the low reliability of the message transmission, the present invention provides a method and apparatus for message transmission. The proposed technique is as follows.

At one aspect, a method of message transmission is provided, for a gateway of a controller area network (CAN), the gateway forwards a message between a transmission unit and a receiving unit. The method comprising:
  determining current state of the gateway;
  generating instruction message indicating the current state of the gateway, in accordance with the current state of the gateway; and transmitting the instruction message to the receiving unit.

Alternatively, the instruction message includes a default value, the default value indicates the current state as a default state,
  the determining current state of the gateway includes, determining the current state of the gateway as the default state when the message sent from the transmission unit is not received within a predetermined wakeup period after the receiving unit wakes up, and
  the generating instruction message indicating the current state of the gateway includes generating the default value in accordance with the default state.

Alternatively, before determining the current state of the gateway as the default state, the method further comprising:
  forwarding the message to the receiving unit when the message sent from the transmission unit is received, within the predetermined wakeup period after the receiving unit wakes up.

Alternatively, after receiving the message sent from the transmission unit, the method further comprising:
  repeatedly transmitting a most recently received message to the receiving unit when no message subsequently sent from the transmission unit is received within a predetermined transmission period.

Alternatively, the instruction message includes a timeout value, the timeout value indicates the current state as a timeout state, the determining the current state of the gateway includes,
  when no message sent from the transmission unit is received from the time the receiving unit wakes up to ending of the predetermined wakeup period after the receiving unit wakes up, determining the current state of the gateway as the timeout state, or
  when an interval, from initial transmission of the most recently received message to the receiving unit to current transmission of the most recently received message to the receiving unit, exceeds a predetermined timeout period, determining the current state of the gateway as the timeout state, and
  the generating instruction message indicating the current state of the gateway includes generating the timeout value in accordance with the timeout state.

At another aspect, An apparatus of message transmission is provided. The apparatus comprising:
  a determination unit, determining current state of a gateway;
  a generation unit, based on the current state of a gateway, generating a instruction message indicating the current state of a gateway; and
  a first transmission unit, transmitting the instruction message to a receiving unit.

Alternatively, the instruction message includes a default value, the default value indicates the current state of a gateway as a default state,
  the determination unit includes a first determination module, determining the current state of the gateway as the default state when a message sent from the transmission unit is not received, within a predetermined wakeup period after the receiving unit wakes up, and
  the generation unit includes a first generation module, generating a default value according to the default state.

Alternatively, the apparatus further comprising:
  a second transmission unit, forwarding the message to the receiving unit when the message sent from the transmission unit is received, during the predetermined wakeup period after the receiving unit wakes up.

Alternatively, the apparatus further comprising:
  a third transmission unit, repeatedly sending a most recently received message to the receiving unit when the message subsequently sent from the transmission unit is not received, during a predetermined transmission period.

Alternatively, the instruction message includes a timeout value, the timeout value indicates the current state of the gateway as a timeout state, the determination unit includes a second determination module, determining the current state of the gateway as the timeout state when no message sent from the transmission unit is received from the receiving unit wakes up to ending of the predetermined wakeup period after the receiving unit wakes up, or determining the current state of the gateway as the timeout state when an interval, from initial transmission of the most recently received message to the receiving unit to current transmission of the most recently received message to the receiving unit, exceeds a predetermined timeout period, and a second generation module generating the timeout value in accordance with the timeout state.

The advantage of the embodiment of the present invention is:

In the method and the apparatus of a message transmission provided in the embodiment of the present invention, the instruction message indicating the current state is generated according to the current status of the gateway, and the instruction message is sent to the receiving unit, such that the receiving unit can determine the transmission status of the message in the CAN network, and respond accordingly, resulting in improvement of the message transmission stability.

DRAWING DESCRIPTION

To better describe the techniques in embodiments of the present invention, enclosed drawings for illustrating the embodiments of the present invention are briefly described below. Obviously, the enclosed drawings in the following description only illustrate some of the embodiments of the present invention. Person of ordinary skill in the art may derive additional drawings based on the enclosed drawings easily.

DETAILED DESCRIPTION

To better describe the objectives, technical solutions, and advantages of the present invention, the embodiments of the present invention are described in details below with reference to the enclosed drawings.

Figure 1:
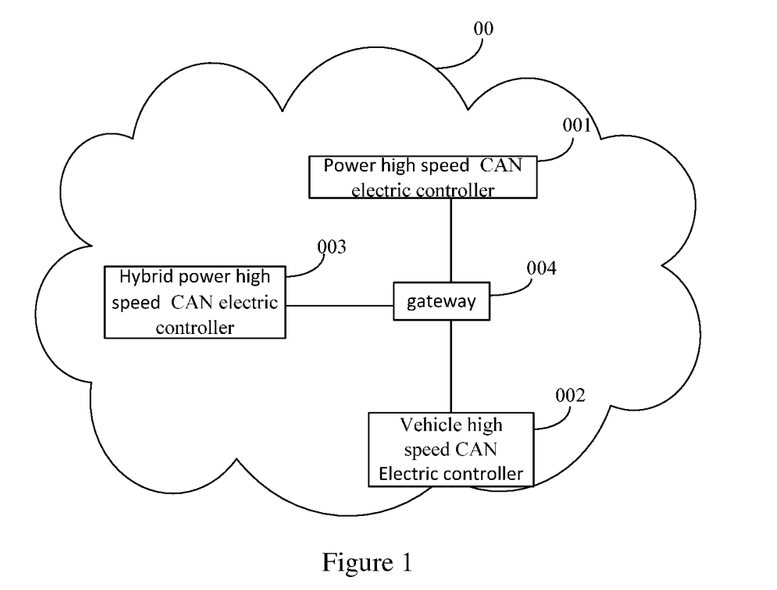
FIG. 1 is a structure schematic of a CAN network according to an embodiment of the present invention.

FIG. 1 is a structure schematic of a controller area network (CAN) 00 according to an embodiment of the present invention. The CAN 00 may include a power high-speed CAN electronic controller 001, a vehicle high-speed CAN electronic controller 002, a hybrid power high-speed CAN electronic controller 003, and a gateway 004. Among the power high-speed CAN electronic controller 001, the vehicle high-speed CAN electronic controller 002, and the hybrid power high-speed CAN electronic controller 003, messages can be transmitted via the gateway 004 in the CAN network. The power high-speed CAN electronic controller 001 can include such electric controllers as an engine, a controller, a gearbox, an anti-lock devices, and an airbag etc. The vehicle high-speed CAN electronic controller 002 can include such electronic controllers as doors, lights, wipers, instruments, audio, and an air conditioner etc. The hybrid power high-speed CAN electronic controller 003 can include such electronic controllers as a battery, a vehicle controller, and a motor etc. Specifically, in the embodiment of the present invention, a transmission unit and a receiving unit can be any two electronic controllers from the power high-speed CAN electronic controller 001, the vehicle high-speed CAN electronic controller 002, or the hybrid power high-speed CAN electronic controller 003 in the CAN 00 network.

Figure 2:
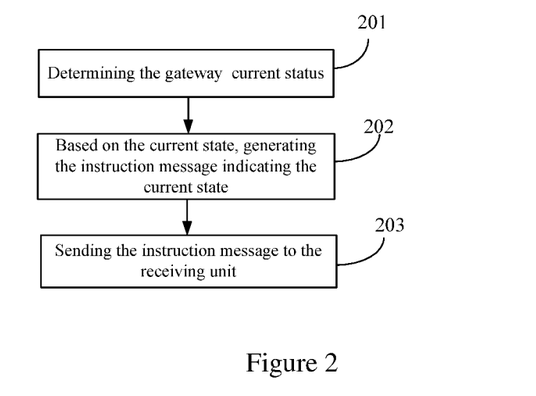
FIG. 2 is a flowchart of a message transmission method according to an embodiment of the present invention.

The embodiment of the present invention provides the message transmission method for the gateway of the CAN network. The gateway can forward the messages between the transmission unit and the receiving unit. As shown in FIG. 2, the method can comprise:

Step 201, determining current state of the gateway.

Step 202, based on the current state of the gateway, generating instruction message indicating the current state of the gateway.

Step 203, transmitting the instruction message to the receiving unit.

In summary, the message transmission method provided by the embodiment of the present invention, in accordance with the current state of the gateway, the instruction message indicating the current state of the gateway can be generated and transmitted to the receiving unit. Thus, the receiving unit can determine message transmission status in the CAN network, and respond accordingly, resulting in improvement of message transmission stability.

For example, the instruction message can include a default value, wherein the default value can indicate that the current state of the gateway is a default state. The step 201 can include, within a predetermined wakeup period after the receiving unit wakes up, if no message from the transmission unit is received, the current state of the gateway can be determined as the default state.

The step 202 can include, generating the default value according to the default state.

Notably, before determining the current state of the gateway as the default state, the method further comprising: within the predetermined wakeup period after the receiving unit wakes up, if the message sent from the transmission unit is received, the message can be forwarded to the receiving unit.

Specifically, after receiving the message sent from the transmission unit, the method further comprising: if no subsequence message sent from the transmission unit is received within a predetermined transmission period, the most recently received message can be repeatedly transmitted to the receiving unit.

For example, the instruction message can include a timeout value, wherein the timeout value can indicate the current state as a timeout state. The step 201 can include: the current state of the gateway can be determined as the timeout state if no message sent from the transmission unit is received from the time that the receiving unit wakes up to the end of the predetermined wakeup period after the receiving unit wakes up. Or, the current state of the gateway can be determined as the timeout state if the interval, from initial transmission to current transmission of the most recently received message to the receiving unit, exceeds a predetermined timeout period.

Notably, the step 202 can include: in accordance with the timeout state, generating the timeout value.

Figure 3:
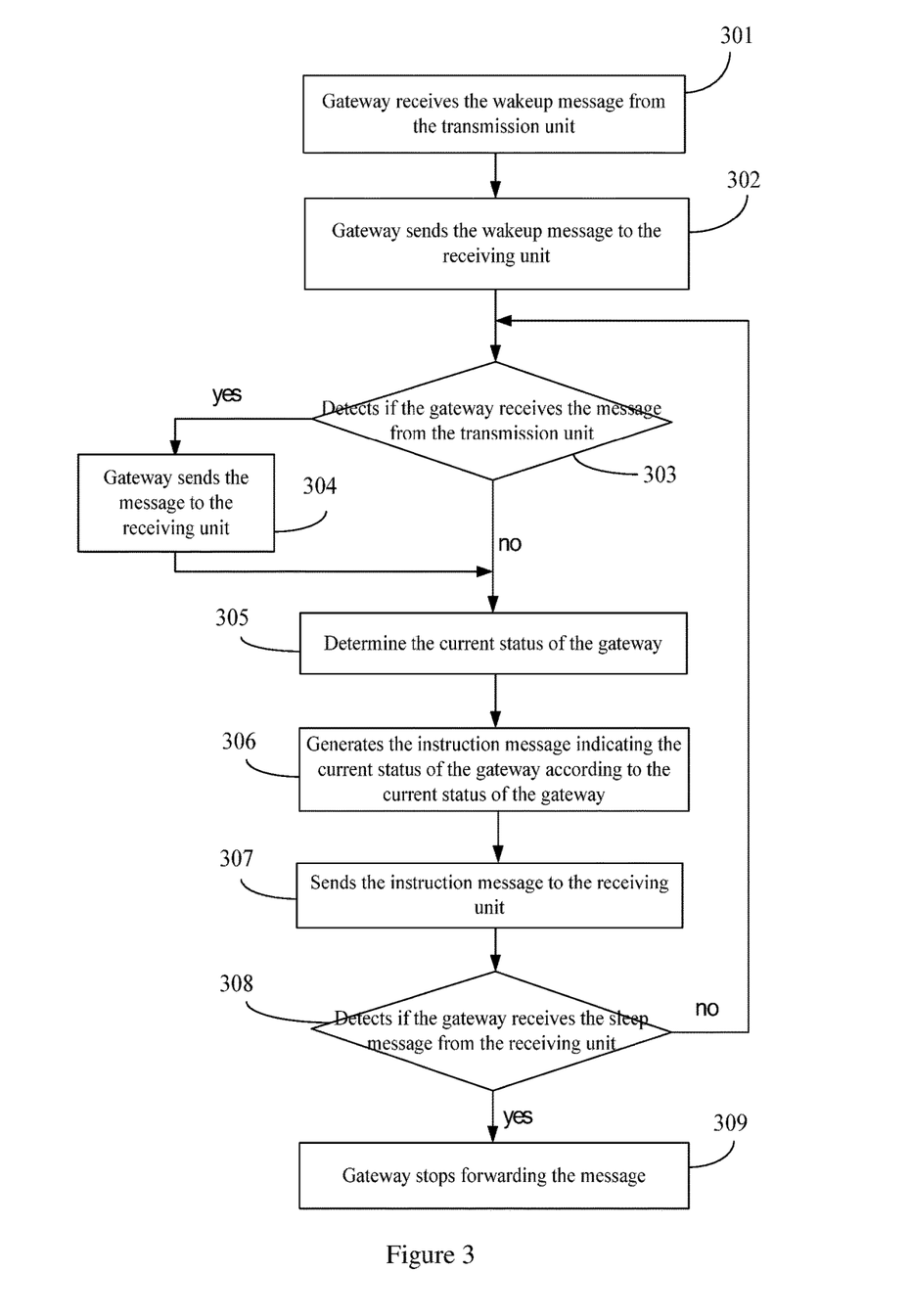
FIG. 3 is a flowchart of a message transmission method according to another embodiment of the present invention.

As shown in FIG. 3 the embodiment of the present invention provides another message transmission method for a gateway of the CAN network, wherein the gateway can forward a message between the transmission unit and receiving unit. The method can includes:

Step 301, the gateway receives a wakeup message from the transmission unit, and proceeds to step 302.

Notably, when the transmission unit needs to send a message, the transmission unit first can generate the wakeup message for waking up the gateway and the receiving unit, and send the wakeup message to the gateway via CAN network to wake up the gateway. For example, the wakeup message may include a receiving unit identification. When the gateway is at awake state, the gateway can forward the message between the transmission unit and the receiving unit. When the gateway is at sleep state, the gateway cannot forward the message between the transmission unit and the receiving unit.

Step 302, the gateway sends the wakeup message to the receiving unit, and proceeds to step 303.

Specifically, after the gateway receives the wakeup message sent from the transmission unit, the wakeup message can be sent to the receiving unit via the CAN network in accordance with the receiving unit identification in the wakeup message. The receiving unit can switch from the sleep state to the awake state. For example, when the receiving unit is at the awake state, the receiving unit can receive the forwarded message from the gateway. When the receiving unit is at the sleep state, the receiving unit cannot receive the forwarded message from the gateway.

Step 303, detecting whether the gateway receives the messages sent from the transmission unit. If yes, proceeds to step 304. If not, proceeds to step 305.

For example, when the transmission unit generates the message and sends the message to the receiving unit via the CAN network, the transmission unit may send the message to the gateway via CAN network, so that the gateway can detect the message.

Step 304, the gateway sends the message to the receiving unit, and proceeds to step 305.

Specifically, after the gateway receives the message, the gateway can send the message to the receiving unit via CAN network.

Notably, while the gateway forwards the message to the receiving unit, the gateway can detect, within a predetermined transmission period, whether the gateway subsequently receives the message sent from the transmission unit. For example, the predetermined transmission period can be an interval, from the time that the gateway receives the message sent from the transmission unit to the time that the gateway subsequently receives a message sent from the transmission unit.

If during the predetermined transmission period, the message subsequently sent from the transmission unit is received, then proceeds to step 304. If during the predetermined transmission period, no message subsequently sent from the transmission unit is received, the message can be lost during the message forwarding procedure from the transmission unit to the gateway. The gateway can repeatedly send the most recently received messages to the receiving unit. When the receiving unit repeatedly receives the most recently received message, the receiving unit can determine that the message is lost during the message forwarding procedure from the transmission unit to the gateway. For example, after the gateway receives the message sent from the transmission unit, the message can be stored, and deleted periodically. The most recently received message may be the message most recently received from the transmission unit and stored.

Step 305, determining the current state of the gateway, and proceeding to step 306.

At one aspect, within the predetermined wakeup period after the receiving unit wakes up, if no message sent from the transmission unit is received, the current state of the gateway can be determined as the default state.

Specifically, the predetermined wakeup period can be 500 milliseconds (ms), the predetermined wakeup period is within 500 ms after the receiving unit wakes up. Within the predetermined wakeup period after the receiving unit wakes up, once it is detected in the step 303 that the gateway does not receive the message sent from the transmission unit, the current state of the gateway can be determine as the default state.

At the other aspect, from the time that the receiving unit wakes up to the end of the predetermined wakeup period after the receiving unit wakes up, if no message sent from the receiving unit is received, the current state of the gateway can be determined as the timeout state. For example, the predetermined wakeup period may be 500 ms. The receiving unit can wake up after receiving the wakeup message sent from the gateway. From the time the receiving unit wakes up to the end of the predetermined wakeup period after the receiving unit wakes up, as detected in the step 303, if the gateway does not receive the message sent from the transmission unit, the current state of the gateway can be determined as the timeout state.

Alternatively, if the interval, from the initial transmission to the current transmission of the most recently received message to the receiving unit, exceeds the predetermined timeout period, the current state of the gateway can be determined as the timeout state. Notably, if within the predetermined transmission period, the gateway does not subsequently receive the message sent from the transmission unit, the gateway can repeatedly transmit the most recently received message to the receiving unit. Specifically, the predetermined timeout period may be the greatest of 4.5 times of message cycle of the most recently received message and 500 ms. At the end of the predetermined timeout period, the current state of the gateway can be determined as the timeout state.

Step 306, based on the current state of the gateway, generating the instruction message indicating the current state of the gateway, and proceeding to step 307.

At one aspect, when the current state of the gateway is the default state, the gateway can generate the default value indicating the current default state, in accordance with the default state, wherein the instruction message can be the default value. Notably, the default value may be zero. At the other aspect, when the current state of the gateway is the timeout state, the gateway can generate the timeout value indicating the current timeout state, in accordance with the timeout state, wherein the instruction message can be the timeout value. Notably, the timeout value can be F.

Step 307, transmitting the instruction message to the receiving unit, and proceeding to step 308.

For example, the instruction message may be the default value or the timeout value. The gateway can send the instruction message to the receiving unit via the CAN network.

When the receiving unit receives the default value sent from the gateway, the receiving unit can determine that, within the predetermined wake up period after the receiving unit wakes up, the gateway does not receive the message sent from the transmission unit.

When the receiving unit receives the timeout value forwarded from the gateway, the receiving unit can determine that, from the time that the receiving unit wakes up to the end of the predetermined wakeup period after the receiving unit wakes up, the gateway does not receive the message transmitted from the transmission unit. Or, after a message is lost during the message forwarding procedure from the transmission unit to the gateway, the gateway can repeatedly send the most recently received message to the receiving unit, and the interval, from the initial transmission to the current transmission of the most recently received message to the receiving unit, exceeds the predetermined timeout period.

Step 308, the gateway detects whether a sleep message is received from the receiving unit. If yes, proceeds to step 309. If not, proceeds to step 303.

Notably, when the receiving unit needs to switch from the awake state to a sleep state, the receiving unit can send the sleep message to the gateway via the CAN network, wherein the sleep message can indicate that the receiving unit enters the sleep state, and is not able to receive the forwarded message from the gateway.

Step 309, the gateway stops forwarding the message.

Specifically, after the gateway detects the sleep message from the receiving unit, the gateway can stop forwarding the message to the receiving unit.

In summary, the message transmission method provided by the embodiment of the present invention, in accordance with the current state of the gateway, the instruction messages indicating the current state can be generated and transmitted to the receiving unit. Thus, the receiving unit can determine the transmission status of the message in the CAN network, and respond correspondingly, resulting in improvement of the message transmission stability.

Figure 4:
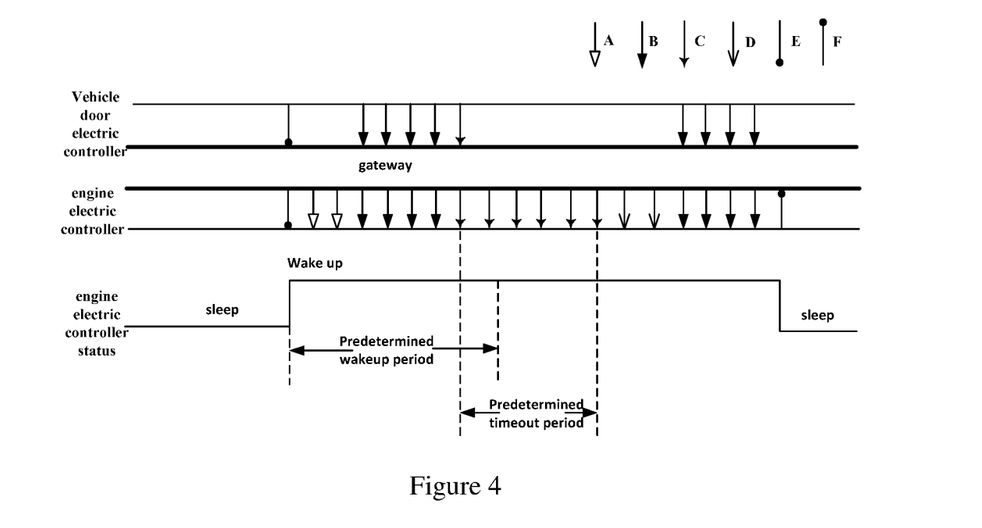
FIG. 4 is a schematic of operation states according to an embodiment of the present invention.

For example, as shown in FIG. 4, assume the transmission unit is the engine electronic controller of the power high-speed CAN electronic controller, the receiving unit is the instrument electronic controller of the vehicle high-speed CAN electronic controller. When the engine begins to supply fuel, the engine electronic controller can generate a wakeup message E, and send the wakeup message E to the gateway via the CAN network to wake up the gateway. Notably, that the wakeup message E may include an instrument electronic controller identification. After the gateway receives the wakeup message E, the gateway can based on the instrument electronic controller identification of the wakeup message E send the wakeup message E to the instrument electronic controller via the CAN network to wake up the instrument electronic controller, such as to turn on the instrument electronic controller.

After the gateway wakes up, it is detected whether a message B sent from the engine electronic controller is received by the gateway. For example, the message B sent from the engine electronic controller to the gateway can be real time engine speed. If the gateway receives the message B sent from the engine electronic controller, the gateway can forward the message B to the instrument electronic controller, and then evaluate the current state of the gateway. Notably, when the instrument electronic controller receives the message B, the instrument electronic controller can determine that the message B generated by the engine electronic controller is forwarded to the gateway normally, the message is not lost. If the gateway does not receive the message B sent from the engine electronic controller, then proceed to evaluate the current state of the gateway.

Notably, when the gateway receives the message B sent from the engine electronic controller and the gateway forwards the message B to the instrument electric controller, the gateway can detect, within the predetermined transmission period, whether the gateway subsequently receives the message B sent from the engine electric controller, such as the next engine speed. For example, the predetermined transmission period can be the interval, from the time that the gateway receives the message B sent from the engine electronic controller to the time that the gateway subsequently receives the message B sent from the engine electronic controller. If within the predetermined transmission period, the message B sent subsequently from the engine electronic controller, such as next engine speed, is received, the gateway can forward the subsequently received message B to the engine electronic controller. If during the predetermined transmission period, the message B sent subsequently from the engine electronic controller is not received, the message B can be lost during the forwarding procedure from the engine electronic controller to the gateway. The gateway can repeatedly send a most recently received message C to the instrument electronic controller, the most recently received message C can be the last engine speed. When the instrument electronic controller repeatedly receives the most recently received message C sent from the gateway, the instrument electronic controller can determine that the message is lost during the forwarding procedure from the engine electronic controller to the gateway.

When evaluating the current state of the gateway, the following situations can occur:

at one aspect, as shown in FIG. 4, within the predetermined wakeup period after the instrument electric controller wakes up, if the gateway does not receive the message B sent from the engine electronic controller, the current state of the gateway can be determined as the default state. According to the default state, the gateway can generate a default value A indicating the current default state, and forward the default value A indicating the current default state to the instrument electronic controller. When the instrument electronic controller receives the default value A, the instrument electronic controller can determine that, within the predetermined wakeup period after the instrument electronic controller wakes up, the engine electronic control does not send the message B to the gateway.

Figure 5:
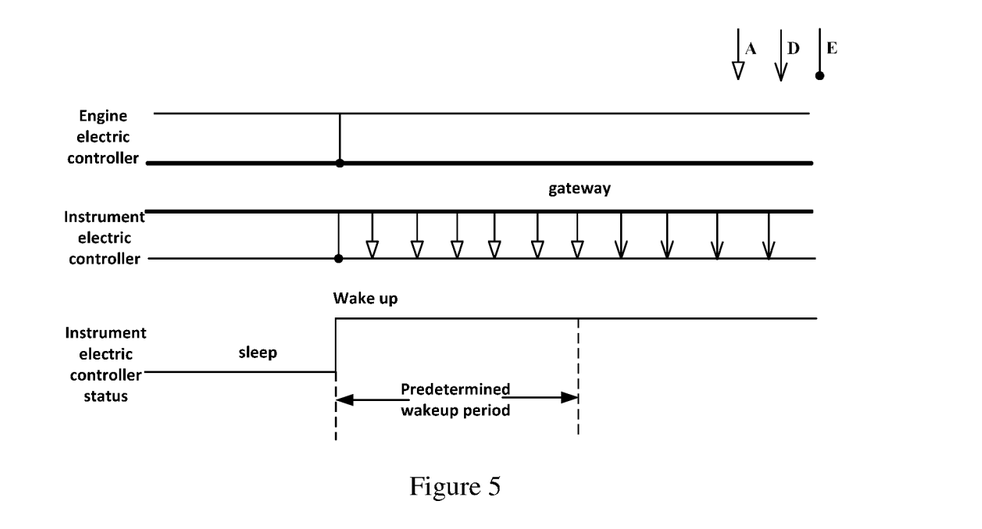
FIG. 5 is a schematic of operation states according to another embodiment of the present invention.

At the other aspect, as shown in FIG. 5, if from the time that the instrument electric controller wakes up, to the end of the predetermined wakeup period after the instrument electric controller wakes up, the message B sent from the engine electronic controller is not received, the current state of the gateway can be determined as the timeout state. When the current state of the gateway is the timeout state, the gateway can generate a timeout value D indicating the current timeout state, in accordance with the timeout state. When the instrument electric controller receives the timeout value D after receiving the default value A, the instrument electronic controller may determine that, from the time the instrument electric controller wakes up to the end of the predetermined wake up period after the instrument electronic controller wakes up, the gateway does not receive the message sent from the engine electronic controller.

Alternatively, as shown in FIG. 4, after the message is lost during the message forwarding procedure from the engine electronic controller to the gateway, and the gateway repeatedly sends the most recently received message C to the instrument electronic controller, the current state of the gateway can be determined as the timeout state if the interval, from the initial transmission to the current transmission of the most recently received message C to the instrument electronic controller, exceeds the predetermined timeout period. Notably, the most recently received message C can be the last engine speed. When the current state of the gateway is the timeout state, the gateway can generate the timeout value D indicating the current timeout state, in accordance with the timeout state. When the instrument electronic controller receives the timeout value D after receiving the message C, the instrument electronic controller may determine that, after the message is lost during the forwarding procedure from the engine electronic control to the gateway, the gateway repeatedly sends the most recently received message to the instrument electric controller, and the interval, from the initial transmission to the current transmission of the most recently received message C to the instrument electronics controller, exceeds the predetermined timeout period.

When the instrument electric controller needs to switch from the awake state to the sleep state, such as the instrument electric controller needs to turn off from on, the instrument electric controller can send a sleep message F to the gateway via the CAN network. The sleep message F can indicate that the instrument electronic controller enters the sleep state, and is not able to receive the message forwarded from the gateway. After the gateway detects the sleep message F sent from the instrument electronic controller, the gateway can stop forwarding the message to the instrument electronic controller.

Figure 6:
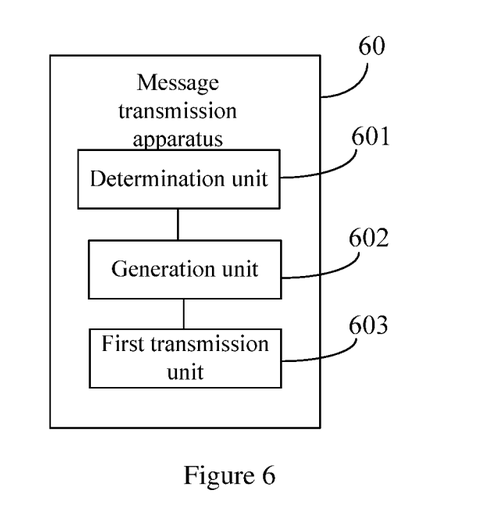
FIG. 6 is a structure schematic of a message transmission apparatus according to an embodiment of the present invention.

As shown in FIG. 6, the embodiment of the present invention provides a message transmission apparatus 60, the message transmission apparatus 60 may include:
 a determination unit 601, determining the current state of the gateway;
 a generation unit 602, based on the current state, generating the instruction message indicating the current state; and
 a first transmission unit 603, transmitting the instruction message to the receiving unit.

In summary, in the message transmission apparatus provided by the embodiment of the present invention, the determination unit can determine the current state of the gateway, the generation unit can generate the instruction message indicating the current state based on the current state of the gateway, and the first transmission unit can send the instruction message to the receiving unit. Therefore the receiving unit can determine the transmission status of the message in the CAN network, and respond accordingly, resulting in improvement of the message transmission stability.

Figure 7:
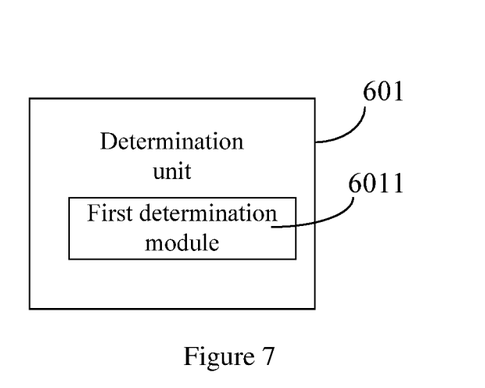
FIG. 7 is a structure schematic of a confirmation unit according to an embodiment of the present invention.

Notably, the instruction message can include a default value, the default value can indicate the current state as the default state. As shown in FIG. 7, the determination unit 601 may include:
 a first determination module 6011, during the predetermined wakeup period after the receiving unit wakes up, if no message sent from the transmission unit is received, the current state of the gateway can be determined as the default state.

Figure 8:
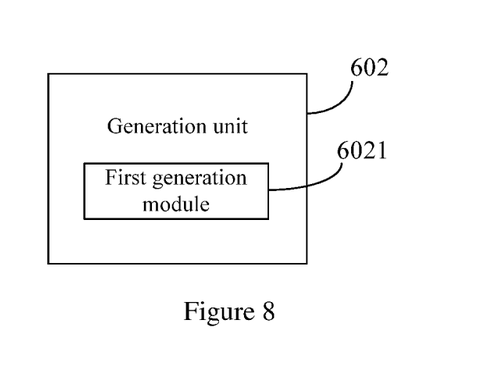
FIG. 8 is a structure schematic of a generation unit according to an embodiment of the present invention.

As shown in FIG. 8, the generation unit 602 can include:
 a first generation module 6021, generating a default value according to the default state.

Figure 9:
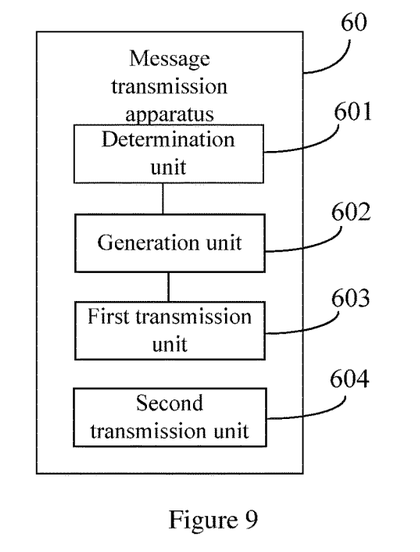
FIG. 9 is a structure schematic of a message transmission apparatus according to another embodiment of the present invention.

As shown in FIG. 9, the embodiment of the present invention provides another message transmission apparatus 60. The message transmission apparatus 60 may include:
 a determination unit 601, determining the current state of the gateway;
 a generation unit 602, generating the instruction message indicating the current state based on the current state;
 a first transmission unit 603, sending the instruction message to the receiving unit; and
 a second transmission unit 604, during the predetermined wakeup period after the receiving unit wakes up, if the message sent from the transmission unit is received, forwarding the message to the receiving unit.

In summary, in the message transmission apparatus provided by the embodiment of the present invention, the determination unit can determine the current state of the gateway, the generation unit can generate the instruction message indicating the current state based on the current state of the gateway, and the first transmission unit can transmit the instruction message to the receiving unit. Therefore, the receiving unit can determine the transmission status of the message in the CAN network, and respond appropriately, resulting in improving the stability of message transmission.

Figure 10:
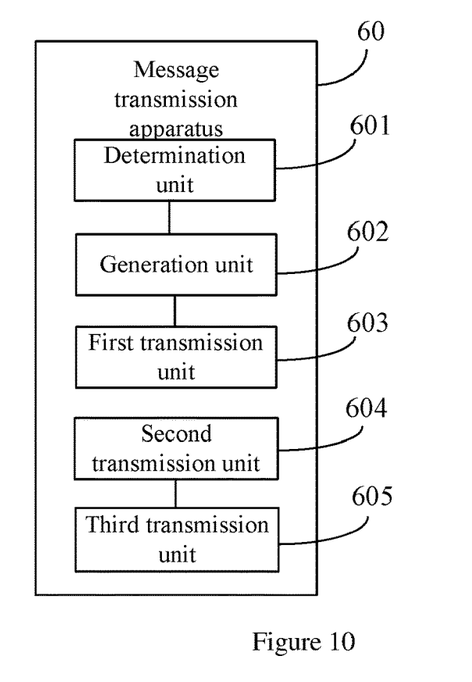
FIG. 10 is a structure schematic of a message transmission apparatus according to another embodiment of the present invention.

As shown in FIG. 10, the embodiment of the present invention provides a further message transmission apparatus 60, the message transmission apparatus 60 may include:
 a determination unit 601, determining the current state of the gateway;
 a generation unit 602, generating the instruction message indicating the current state based on the current state;
 a first transmission unit 603, transmitting the instruction message to the receiving unit;
 a second transmission unit 604, during the predetermined wakeup period after the receiving unit wakes up, if the message sent from the receiving unit is received, forwarding the message to the receiving unit;
 a third transmission unit 605, if during the predetermined transmission period, the message subsequently sent from the transmission unit is not received, repeatedly sending the most recently received message to the receiving unit.

In summary, in the message transmission apparatus provided by the embodiment of the present invention, the determination unit can determine the current state of the gateway, the generation unit can generate the instruction message indicating the current state based on the current state of the gateway, and the first transmission unit can send the instruction message to the receiving unit. Therefore, the receiving unit can determine the transmission status of the message in the CAN network, and respond appropriately, resulting in improving the stability of message transmission.

Figure 11:
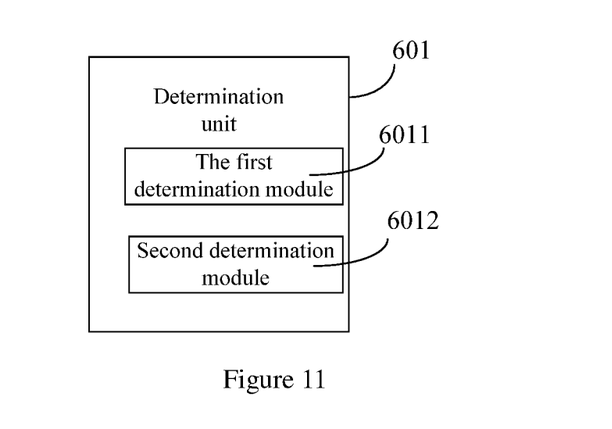
FIG. 11 is a structure schematic of a determination unit according to another embodiment of the present invention.

Notably, the instruction message can include the timeout value, the timeout value can indicate the current state as the timeout state. As shown in FIG. 11, the determination unit 601 may include:

a first determination module 6011, during the predetermined wake up period after the receiving unit wakes up, if no message sent from the transmission unit is received, the current state of the gateway can be determined as the default state.

The second determination module 6012, from the time that the receiving unit wakes up to the end of the predetermined wakeup period after the receiving unit wakes up, if no message sent from the transmission unit is received, the current state of the gateway can be determined as the timeout state. Or, if the interval, from the initial transmission of the most recently received message to the receiving unit to the current transmission of the most recently received message to the receiving unit, exceeds the predetermined timeout period, the current state of the gateway can be determined as the timeout state.

Figure 12:
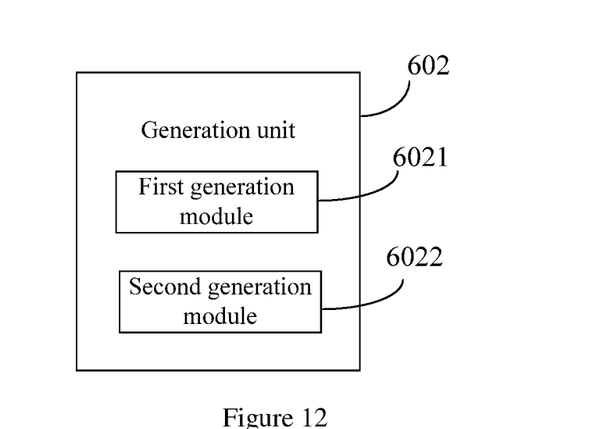
FIG. 12 is a structure schematic of a generation unit according to another embodiment of the present invention.

As shown in FIG. 12, the generation unit 602 may include:

a first generation module 6021, generating the default value according to the default state;

a second generation module 6022, generating the timeout value according to the timeout state.

In summary, the message transmission apparatus provided in the embodiment of the present invention, the determination unit can determine the current state of the gateway, the generation unit can generate the instruction message indicating the current state based on the current state of the gateway, and the first transmission unit can send the instruction message to the receiving unit. Therefore, the receiving unit can determine the transmission status of the message in the CAN network, and respond appropriately, resulting in improving the stability of the message transmission.

The present invention is described by, but not limit to, the above preferred embodiments. Any modification, alternative, or improvement following the principle of the present invention should fall within the protection scope of the present invention.

What claimed is:

1. A method of message transmission for a gateway of a controller area network (CAN) comprising:
   determining a current state of the gateway, wherein the gateway forwards a message between a transmission unit and a receiving unit;
   generating an instruction message indicating the current state of the gateway, in accordance with the current state of the gateway; and
   transmitting the instruction message to the receiving unit;
   wherein the instruction message includes a default value, and the default value indicates the current state as a default state,
   determining the current state of the gateway comprises determining the current state of the gateway as the default state when the message sent from the transmission unit is not received within a predetermined wakeup period after the receiving unit wakes up, and
   generating the instruction message indicating the current state of the gateway comprises generating the default value in accordance with the default state.

2. The method according to claim 1, further comprising:
   before determining the current state of the gateway as the default state,
   forwarding the message to the receiving unit when the message sent from the transmission unit is received within the predetermined wakeup period after the receiving unit wakes up.

3. The method according to claim 2, further comprising:
   after receiving the message sent from the transmission unit, repeatedly transmitting a most recently received message to the receiving unit when no message subsequently sent from the transmission unit is received within a predetermined transmission period.

4. The method according to claim 3, wherein
   the instruction message includes a timeout value, the timeout value indicates the current state as a timeout state, the determining the current state of the gateway includes,
   determining the current state of the gateway as the timeout state when no message sent from the transmission unit is received, from the time the receiving unit wakes up to ending of the predetermined wakeup period after the receiving unit wakes up, or
   determining the current state of the gateway as the timeout state when an interval, from initial transmission of the most recently received message to the receiving unit to current transmission of the most recently received message to the receiving unit, exceeds a predetermined timeout period, and
   the generating instruction message indicating the current state of the gateway includes generating the timeout value in accordance with the timeout state.

5. An apparatus of message transmission comprising:
   a determination unit, determining current state of a gateway;
   a generation unit, generating an instruction message indicating the current state of the gateway, in accordance with the current state of the gateway; and
   a first transmission unit, transmitting the instruction message to a receiving unit,
   wherein the instruction message includes a default value, and the default value indicates the current state as a default state,
   the determination unit comprises a first determination module determining the current state of the gateway as the default state when a message sent from the transmission unit is not received within a predetermined wakeup period after the receiving unit wakes up, and
   the generation unit comprises a first generation module generating a default value according to the default state.

6. The apparatus according to claim 5, further comprising:
   a second transmission unit, forwarding the message to the receiving unit when the message sent from the transmission unit is received during the predetermined wakeup period after the receiving unit wakes up.

7. The apparatus according to claim 6, further comprising:
   a third transmission unit, repeatedly sending a most recently received message to the receiving unit when the message subsequently sent from the transmission unit is not received during a predetermined transmission period.

8. The apparatus according to claim 7, wherein
   the instruction message includes a timeout value, the timeout value indicates the current state as a timeout state,
   the determination unit includes a second determination module,
   determining the current state of the gateway as the timeout state when no message sent from the transmission unit is received from the receiving unit wakes up to ending of the predetermined wakeup period after the receiving unit wakes up, or determining the current state of the gateway as the timeout state, when an interval, from initial transmission of the most recently received message to the receiving unit to current transmission of the most recently received message to the receiving unit, exceeds a predetermined timeout period, and a second generation module generating the timeout value in accordance with the timeout state.

* * * * *